(12) United States Patent
Böker

(10) Patent No.: US 11,738,419 B2
(45) Date of Patent: Aug. 29, 2023

(54) METHOD FOR PRODUCING A CLUTCH PACK FORMED BY CLUTCH PLATES ARRANGED ON TOP OF ONE ANOTHER, AND DEVICE FOR CARRYING OUT A METHOD OF THIS TYPE

(71) Applicant: Kienle + Spiess GmbH, Sachsenheim (DE)

(72) Inventor: Björn Böker, Esslingen (DE)

(73) Assignee: Kienle + Spiess GmbH, Sachsenheim (DE)

( * ) Notice: Subject to any disclaimer, the term of this patent is extended or adjusted under 35 U.S.C. 154(b) by 43 days.

(21) Appl. No.: 17/380,101

(22) Filed: Jul. 20, 2021

(65) Prior Publication Data
US 2021/0346996 A1    Nov. 11, 2021

Related U.S. Application Data

(62) Division of application No. 15/780,075, filed as application No. PCT/EP2016/002019 on Nov. 30, 2016, now Pat. No. 11,084,133.

(30) Foreign Application Priority Data

Dec. 20, 2015   (DE) .................... 10 2015 015 762.0

(51) Int. Cl.
*B23K 20/12* (2006.01)
*B23P 23/00* (2006.01)
(Continued)

(52) U.S. Cl.
CPC .............. *B23P 23/00* (2013.01); *B21D 28/22* (2013.01); *B23K 20/129* (2013.01);
(Continued)

(58) Field of Classification Search
CPC ....... B23P 23/00; B23P 2700/12; B23P 15/00; B21D 28/22; B23K 20/1265;
(Continued)

(56) References Cited

U.S. PATENT DOCUMENTS 3,866,014 A  2/1975  Walter
4,002,283 A  1/1977  Nonoyama
(Continued)

FOREIGN PATENT DOCUMENTS

CN        1226114 C  * 11/2005 ........... B23K 20/123
CN     104741769 A  *  7/2015 ........... B23K 20/126
(Continued)

*Primary Examiner* — Kiley S Stoner
(74) *Attorney, Agent, or Firm* — Gudrun E. Huckett

(57) ABSTRACT

A device for performing a method for producing a lamination pack, wherein in the method laminations are cut from an electric strip or sheet; the laminations are placed on top of each other to form a lamination stack; the laminations are connected by material fusion to each other by: locally plasticizing a material of the laminations in an edge region of the laminations by generating friction heat by a tool; mixing the locally plasticized material, at least of the laminations neighboring each other, with the tool; and allowing the plasticized material to cool and fuse the laminations in the edge region to form the lamination pack. The device has a punch press and/or a receptacle for one or a plurality of lamination stacks. The device further has a welding tool that is rotatably driven about an axis of the welding tool and moveable transverse to the axis of rotation.

7 Claims, 3 Drawing Sheets

(51) Int. Cl.
  *B21D 28/22* (2006.01)
  *B23K 20/233* (2006.01)
  *B23K 20/24* (2006.01)
  *B23K 28/02* (2014.01)
  *H02K 15/02* (2006.01)
  *B23K 20/26* (2006.01)
  *B23K 101/18* (2006.01)
  *B23K 103/10* (2006.01)
  *B23K 37/04* (2006.01)

(52) U.S. Cl.
  CPC ...... *B23K 20/1265* (2013.01); *B23K 20/2336* (2013.01); *B23K 20/24* (2013.01); *B23K 20/26* (2013.01); *B23K 28/02* (2013.01); *H02K 15/02* (2013.01); *B23K 20/122* (2013.01); *B23K 37/04* (2013.01); *B23K 2101/18* (2018.08); *B23K 2103/10* (2018.08)

(58) Field of Classification Search
  CPC .. B23K 20/129; B23K 20/2336; B23K 20/24; B23K 20/26; B23K 28/02; B23K 37/04; B23K 2101/18; B23K 2103/10; B23K 20/122–128; H02K 15/02; H01F 41/0233
  USPC .................................................. 228/112.1, 2.1
  See application file for complete search history.

(56) References Cited

U.S. PATENT DOCUMENTS

| | | | |
|---|---|---|---|
| 5,171,962 A | 12/1992 | Sakanishi | |
| 5,695,591 A | 12/1997 | Hamada et al. | |
| 5,697,544 A | 12/1997 | Wykes | |
| 6,247,633 B1 | 6/2001 | White et al. | |
| 7,575,148 B2 * | 8/2009 | Kubouchi | H01G 9/008 228/2.1 |
| 7,703,656 B2 | 4/2010 | Park et al. | |
| 8,028,888 B2 * | 10/2011 | Kumagai | B23K 20/122 228/2.1 |
| 8,261,961 B2 * | 9/2012 | Brice | B23K 20/128 228/2.1 |
| 9,999,940 B2 | 6/2018 | Mialhe et al. | |
| 10,093,075 B2 | 10/2018 | Mochizuki et al. | |
| 11,084,133 B2 * | 8/2021 | Böker | B23K 28/02 |
| 2006/0102699 A1 * | 5/2006 | Burton | B23K 20/124 228/2.1 |
| 2007/0029368 A1 * | 2/2007 | Kubouchi | H01G 9/06 361/313 |
| 2007/0152015 A1 * | 7/2007 | Burton | B23K 20/1255 228/2.1 |
| 2007/0187469 A1 * | 8/2007 | Chen | B32B 7/12 228/112.1 |
| 2007/0228104 A1 * | 10/2007 | Mankus | B23K 20/125 228/101 |
| 2010/0147925 A1 * | 6/2010 | Hanlon | B23K 20/233 228/2.1 |
| 2012/0202089 A1 * | 8/2012 | Hangai | C22C 21/06 228/114 |
| 2015/0183053 A1 * | 7/2015 | Kumagai | B23K 20/1265 228/112.1 |

FOREIGN PATENT DOCUMENTS

| | | | | |
|---|---|---|---|---|
| DE | 100 40 978 | | 3/2002 | |
| DE | 10 2006 000 277 | | 12/2006 | |
| EP | 0 446 714 | | 9/1991 | |
| GB | 888 770 | | 2/1962 | |
| GB | 1 079 773 | | 8/1967 | |
| JP | 11028584 A | * | 2/1999 | ......... B23K 20/1265 |
| JP | H1147859 A | * | 2/1999 | |
| JP | 2006320924 | | 11/2006 | |
| JP | 2008182848 | | 8/2008 | |
| JP | 2008207233 A | * | 9/2008 | ......... B01J 19/2475 |
| JP | 2010110155 | | 5/2010 | |
| JP | 2015123488 A | * | 7/2015 | ........... B23K 20/126 |
| JP | 2017077565 A | * | 4/2017 | ........... B23K 20/122 |
| KR | 101429854 B1 | * | 8/2014 | |
| KR | 20150077361 A | * | 7/2015 | |
| WO | WO-2004084244 A1 | * | 9/2004 | ............. H01G 4/228 |
| WO | WO-2012147204 A1 | * | 11/2012 | ........ B23K 20/1255 |
| WO | 2015/082076 | | 6/2015 | |
| WO | WO-2015122441 A1 | * | 8/2015 | ........... B23K 20/122 |

\* cited by examiner

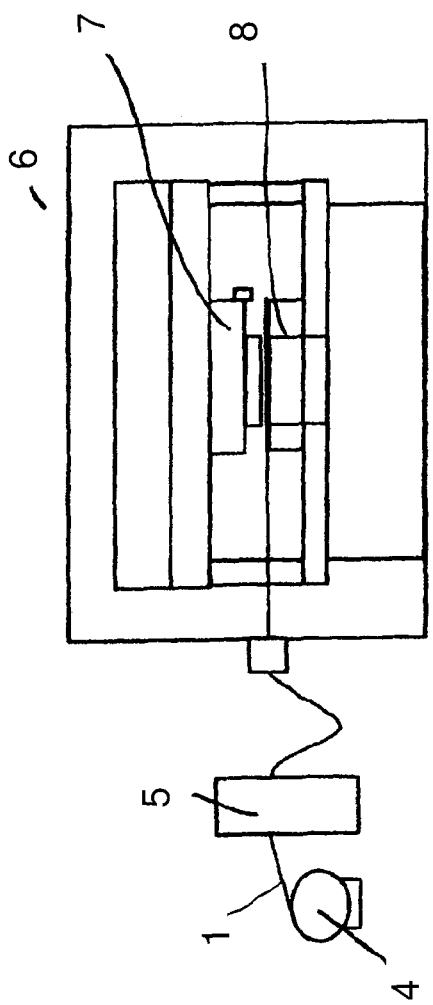
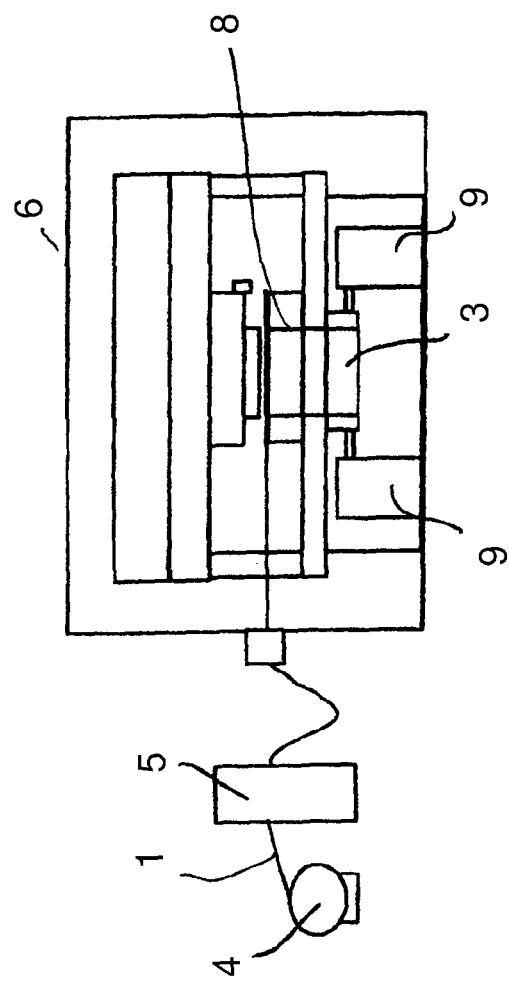

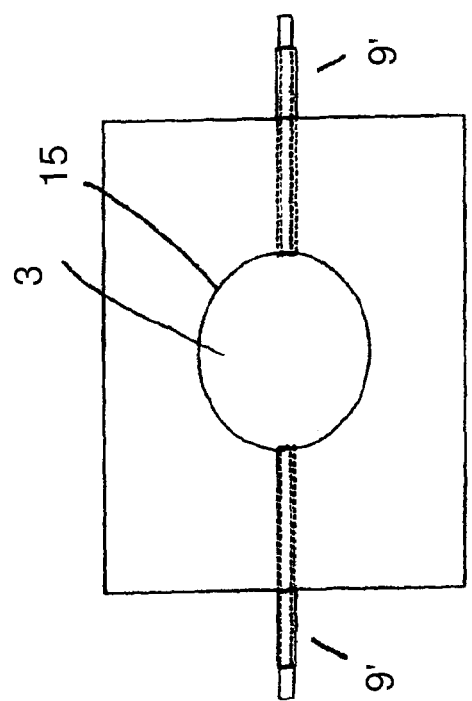
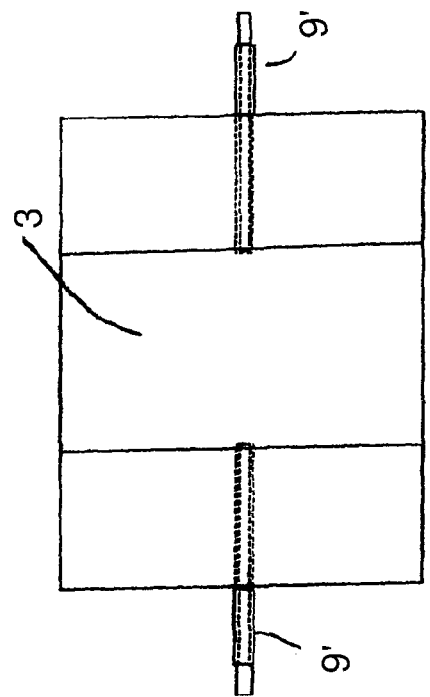
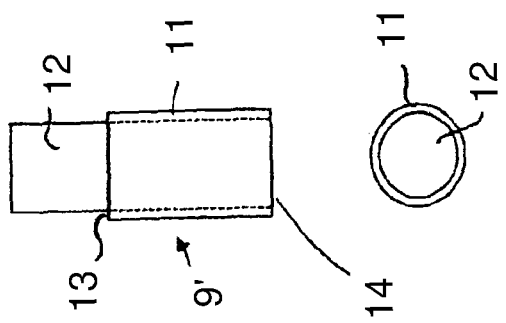

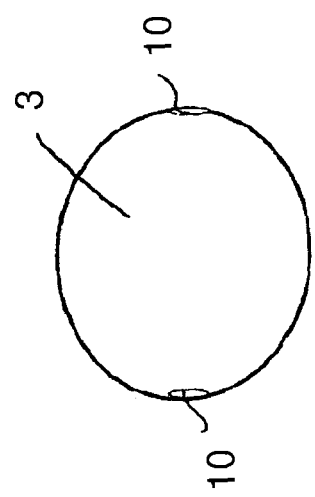

METHOD FOR PRODUCING A CLUTCH PACK FORMED BY CLUTCH PLATES ARRANGED ON TOP OF ONE ANOTHER, AND DEVICE FOR CARRYING OUT A METHOD OF THIS TYPE

CROSS-REFERENCE TO RELATED APPLICATIONS

This application is a divisional application of U.S. patent application Ser. No. 15/780,075 having a filing date of 30 May 2018, which U.S. patent application Ser. No. 15/780,075 is a national stage filing of international application No. PCT/EP2016/002019 having an international filing date of 30 Nov. 2016 and designating the United States, the international application claiming a priority date of 1 Dec. 2015 based on prior filed German patent application No. 10 2015 015 762.0, the entire contents of the aforesaid U.S. patent application, the aforesaid international application, and the aforesaid German patent application being incorporated herein by reference.

BACKGROUND OF THE INVENTION

The invention concerns a method for producing a lamination pack comprised of laminations lying on top of each other, in which the laminations are cut from an electric strip or sheet, placed on top of each other to the lamination pack, and connected to each other within the lamination pack, and a device for carrying out such a method with at least one punch press and/or at least one receptacle for one or a plurality of lamination packs.

It is known to cut laminations from an electric sheet and to place them on top of each other for forming a lamination pack. Subsequently, the laminations lying on top of each other are connected with form fit to each other. For this purpose, the laminations are provided with at least one projection with which the laminations engage corresponding recesses of the respective neighboring lamination. The production of such laminations is complex. Also, it may occur that this form-fit connection becomes detached, for example, during transport or during storage of the lamination pack.

It is furthermore known to fixedly connect the laminations within the lamination pack by screws or rivets which are penetrating this lamination pack. This process is also complex. Moreover, in particular when taller lamination packs are to be formed, the laminations must be rotated respectively by a certain angular amount prior to placement in order to ensure that the lamination pack has a constant height about its circumference.

Therefore, methods are known also in which laminations lying on top of each other are glued to each other.

In a further known method, the laminations lying on top of each other are welded to each other. This welding method however has limitations. For the use of the lamination pack in rotors and/or stators of electric motors or generators, metal strips are frequently employed which are comprised of silicon and aluminum. In case of silicon proportions of more than approximately 3% by weight or silicon and aluminum proportions of more than 4% by weight, such laminations can be welded only with great difficulty. A high silicon contents is however desirable because magnetic losses can be reduced and therefore greater efficiencies can be obtained therewith. Moreover, laminations that are coated with an EC3 insulation varnish are difficult to weld. Also, large and/or also deep heat zones are produced. The gaps between the sheet metals must be precisely adjusted in order to obtain a good welding result.

The invention has the object to configure the method of the aforementioned kind and the device of the aforementioned kind in such a way that the laminations, independent of the starting material and the stack density, can be connected to each other reliably within the lamination pack.

SUMMARY OF THE INVENTION

This object is solved for the method of the aforementioned kind in accordance with the invention in that the material of the laminations is locally plasticized in the edge region by generating friction heat by means of at least one tool such that the material, at least of neighboring laminations, is mixed by means of the tool so that, after cooling of the plasticized material, these laminations are connected to each other by material fusion. For the device of the aforementioned kind, this object is solved in accordance with the invention in that the device comprises at least one welding tool that is rotatably driven about its axis and movable transverse to its axis of rotation.

With the method according to the invention, the laminations can be fixedly connected to each other in a simple, cost-saving way, independent of the material composition of the laminations. With the tool, the material of the laminations is locally plasticized at the edge region in that the lamination is heated locally by means of the tool so strongly that the lamination material becomes plasticized. Then, this plasticized material can be mixed between neighboring laminations by means of the tool. This has the result that, after cooling of the plasticized material, the laminations are fixedly connected to each other with material fusion. The tool itself is selected such that it does not become soft or plasticized in this process. When the laminations are produced from silicon-aluminum strips, the silicon proportion can be so high that the magnetic losses are minimal.

A simple and reliable connection of the laminations within the lamination pack results in an advantageous way when the tool is moved across the height of the lamination pack and, in doing so, is forced with such a great force against the lamination pack that the material of the laminations in the contact region with the tool becomes plasticized. The tool can be adjusted in regard to the width of the weld seam that is being formed at the circumference of the lamination pack. When this weld seam is supposed to have only a very minimal width, a correspondingly narrow tool is employed. By means of the height and/or the duration of the pressing force, it can be determined how deep the material of the laminations is plasticized when performing the method.

The tool is advantageously rotatably driven about its axis during one the advancing movement. By rotating the tool, the plasticized material of neighboring laminations is mixed with each other in a simple way.

In a further simple embodiment, the tool is moved in axial direction along the lamination pack. In this way, a weld seam extending in axial direction is also produced at the lamination pack.

Depending on the configuration of the lamination pack, the tool can however be moved also at an angle at a slant across the height of the lamination pack so that the resulting weld seam is no longer axially extending but has a slope.

In another method, the tool is stationary and is driven in rotation about its axis. In this case, the lamination pack is moved in its height direction relative to the stationary tool and, in doing so, is forced by such a great force against the tool that the material of the laminations is plasticized in the contact region. In this case, the tool can also be adjusted with regard to the width of the weld seam forming at the circumference of the lamination pack.

It is also possible to move the tool or the lamination pack in different directions across the height of the lamination pack. In this way, it is possible to adjust the position and/or the course of the weld seam to the respective specifications. The advancing movement of the tool can be programmed in a very simple way by means of a control unit.

A simple and time-saving method results when the lamination pack is processed with two or more tools.

In this context, the tools work advantageously simultaneously at the lamination pack so that about the circumference of the lamination pack the required weld seams are applied in the desired way.

Preferably, the tools can be driven independent of each other. In this way there is the possibility of controlling the individual tools in a targeted fashion and to impart to them, for example, different advancing paths.

A simple method control results when the tools are provided in a punch press. In this case, the lamination packs can be processed immediately after their assembly in a punch press with the tool.

The tools can also be provided inside a stacking device in which the laminations are stacked to the lamination pack.

The device according to the invention is characterized in that the at least one welding tool is driven in rotation about its axis and, during processing, is movable transverse to this axis of rotation. During its advancing movement, the tool is thus driven in rotation about its axis so that the high friction heat required for plastification of the lamination material is generated in the laminations.

In a simple embodiment, the tool is provided with an exterior head that can be rotatably driven about its axis. For rotation of the exterior head, for example, a gear drive or a belt drive can be provided.

In the exterior head, advantageously a center head is provided which is fixedly or also freely rotatably connected to the exterior head. In this way, the center head is entrained by the rotating exterior head.

In an advantageous embodiment, the center head is adjustable in axial direction of the exterior head relative to the exterior head and preferably rotatable. In a preferred embodiment, this adjustment is achieved by means of a spindle drive by means of which the center head can be adjusted relative to the exterior head.

A compact configuration of the tool results when the exterior head and the center head are coaxially positioned relative to each other.

The subject matter of the application results not only from the subject matter of the individual claims but also from all specifications and features disclosed in the drawings and the description. They are claimed as important to the invention, even if they are not subject matter of the claims, insofar as, individually or in combination, they are novel relative to the prior art.

Further features of the invention result from the additional claims, the description, and the drawings.

BRIEF DESCRIPTION OF THE DRAWINGS

The invention will be explained in more detail with the aid of the embodiment that is illustrated in the drawings.

FIG. 1 shows in schematic illustration and in side view a device according to the invention for punching laminations for forming a lamination pack.

FIG. 2 shows in an illustration corresponding to FIG. 1 the device according to the invention with friction stir welding devices.

FIG. 3 shows in schematic illustration a two-head friction stir tool in side view.

FIG. 4 shows a plan view of the friction stir tool according to FIG. 3.

FIG. 5 shows in schematic illustration a plan view of two friction stir tools engaging the lamination pack.

FIG. 6 shows the friction stir tools and the lamination pack according to FIG. 5 in side view.

FIG. 7 shows a plan view of a lamination pack whose laminations have been connected to each other by friction stir welding.

FIG. 8 shows the lamination pack according to FIG. 7 in side view.

DESCRIPTION OF PREFERRED
EMBODIMENTS

With the device according to FIGS. 1 and 2, laminations 2 (FIG. 8) are cut from a metal strip (electric strip) 1 or an electric sheet in a known way and are stacked to a lamination pack 3. The lamination pack 3 is used for producing rotors or stators of electric motors, but also generators.

The metal strip 1 is coiled on a coiler 4 which is rotatable about its axis. The metal strip 1 that is decoiled from the coiler 4 is passed through a straightening apparatus 5 by means of which the metal strip 1 is straightened for the subsequent punching process. The metal strip 1 downstream of the straightening apparatus 5 reaches a punch press 6 in which the laminations 2 are punched from the metal strip 1.

Also, two or more strips 1 can be guided adjacent to each other into the punch press 6 so that the laminations 2 can be punched simultaneously from the individual metal strips 1. Further, it is possible to punch the laminations in the metal strip 1 not just in one track but also, for example, in two tracks.

The punch press 6 is provided with one or a plurality of corresponding punching tools 7. The laminations 2 which are punched by them reach a chamber 8 into which the laminations 2 are pushed immediately after punching. The chamber 8 forms a receptacle and, as is known in the art, is designed such that the laminations 2 with their edge are contacting with friction the inner wall of the chamber 8 so that they cannot fall out of the chamber 8. In this way, the punched laminations 2 are placed onto each other to a stack in the chamber 8. For each punching stroke, the respectively punched lamination is pushed downwardly onto the laminations that are already located in the chamber. A plunger (not illustrated) on which the laminations 2 are stacked to the lamination pack 3 is projecting into the chamber 8. With each punching stroke, this plunger is moved step-by-step in downward direction so that the respectively punched lamination 2 can be moved downwardly into the chamber 8 so far that the subsequent lamination 2 to be punched can be pushed reliably into the chamber 8.

In case of a plurality of metal strips 1 passing simultaneously through the punch press 6, it is advantageous when each metal strip 1 has correlated therewith one chamber 8 so that in the punch press 6 simultaneously a plurality of lamination packs can be stacked adjacent to each other. There is however also the possibility of providing in the punch press 6 only one chamber 8 into which the laminations, punched from different metal strips 1, are conveyed by means of a transport device, for example, a rotary device, into the region above the chamber 8 and then are pushed into the chamber 8. Such a transport device is in particular advantageous when the laminations 2 are punched from a metal strip 1 in adjacently positioned tracks. It is then possible to transport the adjacently positioned laminations 2 with such a transport unit into the only chamber 8.

So that the lamination stack 3 can be processed further after removal from the punch press 6, the laminations 2 which are resting on each other in the lamination pack 3 are connected fixedly to each other. For this purpose, the laminations 2 lying on top of each other are connected to each other transverse to their plane by a plastification method in that the laminations 2 at the edge are partially plasticized such that laminations 2 lying on top of each other are materially fused and fixedly connected to each other after cooling of this material.

For this purpose, the punch press 6 is provided with at least one friction stir welding device 9 that advantageously is arranged in the region of a stacking device of the punch press 9. At the rim of the sheet metal pack 3, a weld seam 10 (FIGS. 7 and 8) is provided that extends across the height of the lamination pack 3. Depending on the size of the lamination pack 3, a single weld seam 10 may be sufficient. In the embodiment, two diametrically opposed weld seams 10 are provided on the lamination pack 3. Depending on the size of the lamination pack 3, additional weld seams can be provided with which the laminations 2 are held together within the lamination pack 3.

When two or a more weld seams 10 are applied to the lamination pack 3, in principle one friction stir welding device 9 that is arranged to be adjustable about the circumference of the lamination pack 3 is sufficient for this purpose. A faster process results however when one friction stir welding device 9 is provided, respectively, for each weld seam 10 to be applied to the lamination pack 3.

The friction stir welding device 9 comprises a tool 9' with a cylindrical exterior head 11 (FIG. 3) in which a center head 12 is accommodated. The exterior head 11 is driven about its axis in rotation by means of a gear drive or belt drive. By means of a spindle drive, the center head 12 can be precisely adjusted axially relative to the exterior head 11. When the exterior head 11 is rotatably driven about its axis, the center head 12 is accordingly entrained in rotation. At the transition between the center head 12 and the exterior head 11 a radial annular shoulder 13 is formed.

The tool 9' is moved radially against the lamination pack 3 until its end face 14 contacts the outer wall 15 of the lamination pack. The tool 9' is forced at great axial force against the lamination pack 3 whereby it is driven in rotation about its axis. By means of the friction between the flat end face 14 of the tool 9' and the lamination pack 3, the material underneath the end face 14 is heated to just below the melting point of the material of the lamination pack 3. Due to this high temperature, the material of the lamination pack 3 is plasticized. The rotating tool 9' is now moved in height direction of the lamination pack 3 wherein the great axial force and the rotary speed are maintained. Due to the plasticized material in the region of the tool 9', mixing of the material of the laminations 3 lying on top of each other occurs with advancing movement of the tool. The material mixing is realized in that the tool 9' carries out the advancing movement with simultaneous rotary movement. The advancing speed is selected such that in the region of the tool 9' the material of the laminations 2 lying on top of each other becomes soft. Due to the rotary movement, the materials of the laminations 2 lying on top of each other mix so that, after cooling of the plasticized material, the laminations 2 within the lamination pack 3 are connected to each other by material fusion.

The tool 9' is advantageously moved in axial direction along the lamination pack 3 so that the weld seam 10 at the outer wall of the lamination pack 3 extends in axial direction. The tool 9' can be moved, in principle, in different directions along the lamination pack 3 so that the weld seam 10 has a different course. For example, the weld seam 10 can extend at a slant to the axial direction of the lamination pack 3, perpendicular to the axis of the lamination pack 3. Also, the weld seam 10 can have differently slanted course by appropriate movement of the tool 9' in the height direction of the lamination pack 3. The weld seam 10 is provided on the outer wall 15 of the lamination pack 3 such that the laminations 2 are reliably connected to each other.

In the embodiment, for connecting the laminations 2 in the lamination pack 3, two diametrically opposed tools are employed. In this case, on the outer wall 15 of the lamination pack 3 two weld seams 10 that are positioned opposite each other are formed. The two tools 9' are advantageously controlled independent of each other so that also different courses of the weld seams 10 can be generated.

Often, metal strips are employed which are comprised of silicon-aluminum alloys. In case of such metal strips, it is often desired to select the silicon proportion as high as possible. Rotors and/or stators whose lamination packs have been manufactured of such a metal strip have, due to the higher silicon proportion, minimal magnetic losses which leads to greater power of the electric motor. With the described method, laminations of such materials can be connected with each other by material fusion without problem. The silicon proportions in such silicon-aluminum alloys can contain more than approximately 4% by weight of silicon without this having negative effects on the material-fused connection of the laminations 2 with each other. With the tool 9' the material of the laminations is plasticized wherein, by the rotary movement of the tool 9' during its advancing movement, the plasticized material of neighboring laminations 2 will be mixed with each other so that the reliable cohesion of the laminations 2 after cooling of the plasticized material is ensured.

The weld seams 10 have only a minimal depth so that they have no disadvantageous effects on the lamination pack 3 or the properties of the electric motor containing this lamination pack. The weld seam depth is selected such that a reliable connection of the laminations 2 with each other is provided. The described method can be performed in a simple, reliable way and within a very short period of time. The lamination packs 3 produced in this way can be manipulated and transported without problem, without there being the risk that laminations 2 within the lamination pack 3 become detached.

It is further possible to arrange the tool 9' stationarily and to rotate it during the welding process about its axis. In this case, the lamination pack 3 is moved in its height direction relative to the stationary tool 9' and is forced in this context with such a great force against the tool 9' that the material of the laminations 2 within the lamination pack 3 is plasticized in the described manner in the contact region.

What is claimed is:

1. A device for performing a method for producing a lamination pack, the method comprising cutting laminations from an electric strip or electric sheet; placing the laminations on top of each other to form a lamination stack; connecting the laminations by material fusion to each other by: locally plasticizing a material of the laminations in an edge region of the laminations by generating friction heat by at least one tool; mixing the locally plasticized material, at least of the laminations that are neighboring each other, with the at least one tool; and allowing the plasticized material to cool and fuse the laminations in the edge region to form the lamination pack; the device comprising:

- at least one punch press configured to cut the laminations from the electric strip or electric sheet;
- at least one receptacle disposed at the at least one punch press and configured to place the laminations directly on top of each other in the at least one receptacle to a lamination stack;
- at least one friction stir welding tool, wherein the at least one friction stir welding tool is configured to be rotatably driven about an axis of the at least one friction stir welding tool and configured to move transverse to the axis of rotation, wherein the at least one friction stir welding tool is configured to locally plasticize a material of the laminations in an edge region of the laminations by generating friction heat and connect the laminations of the lamination stack in the edge region by material fusion to each other to the lamination pack.

2. The device according to claim 1, wherein the at least one friction stir welding tool comprises an exterior head rotatably driven about the axis of rotation.

3. The device according to claim 2, wherein the at least one friction stir welding tool further comprises a center head accommodated in the exterior head, wherein the center head is connected fixedly or freely rotatable with the exterior head.

4. The device according to claim 3, wherein the center head is adjustable relative to the exterior head in an axial direction of the exterior head.

5. The device according to claim 3, wherein the center head is adjustable relative to the exterior head by a spindle drive.

6. The device according to claim 5, wherein the center head is rotatable by the spindle drive.

7. The device according to claim 3, wherein the exterior head and the center head are coaxially positioned relative to each other.

* * * * *